(12) United States Patent
Mouri et al.

(10) Patent No.: US 10,502,314 B2
(45) Date of Patent: Dec. 10, 2019

(54) VEHICLE OIL PUMP DRIVING CONTROL DEVICE

(71) Applicant: JATCO Ltd, Fuji-shi, Shizuoka (JP)

(72) Inventors: Takanobu Mouri, Kanagawa (JP); Taiichi Onoyama, Kanagawa (JP); Seishi Shimamura, Kanagawa (JP); Kakuzou Kaneko, Kanagawa (JP); Akihiro Toyofuku, Kanagawa (JP); Ryuichi Arai, Kanagawa (JP); Ryuzo Noguchi, Kanagawa (JP); Satoshi Harui, Kanagawa (JP); Hironori Miyaishi, Sagamihara (JP); Tomoyuki Mizuochi, Sagamihara (JP); Kenichi Watanabe, Sagamihara (JP); Masumi Fujikawa, Sagamihara (JP); Kouichi Kotsuji, Numazu (JP); Shingo Suzuki, Zama (JP); Akito Suzuki, Tokyo (JP); Tetsuya Izumi, Ayase (JP); Keisuke Iwado, Ebina (JP); Kazuhiro Miyachi, Yamato (JP)

(73) Assignee: JATCO LTD, Fuji-Shi (JP)

( * ) Notice: Subject to any disclaimer, the term of this patent is extended or adjusted under 35 U.S.C. 154(b) by 144 days.

(21) Appl. No.: 15/559,238

(22) PCT Filed: Mar. 3, 2016

(86) PCT No.: PCT/JP2016/056529
§ 371 (c)(1),
(2) Date: Sep. 18, 2017

(87) PCT Pub. No.: WO2016/147875
PCT Pub. Date: Sep. 22, 2016

(65) Prior Publication Data
US 2018/0073628 A1    Mar. 15, 2018

(30) Foreign Application Priority Data

Mar. 19, 2015 (JP) .................................. 2015-056944

(51) Int. Cl.
*F16H 61/00* (2006.01)
*F16H 59/72* (2006.01)
*F16H 57/04* (2010.01)

(52) U.S. Cl.
CPC ..... *F16H 61/0025* (2013.01); *F16H 57/0434* (2013.01); *F16H 59/72* (2013.01); *F16H 61/0028* (2013.01)

(58) Field of Classification Search
CPC .. F16H 57/0434; F16H 59/72; F16H 61/0025; F16H 61/02; F04D 27/001
(Continued)

(56) References Cited

U.S. PATENT DOCUMENTS

| | | | | |
|---|---|---|---|---|
| 6,110,072 A | * | 8/2000 | Harada | ............... F16H 57/0434 477/157 |
| 6,135,919 A | * | 10/2000 | Shimakura | .......... F16H 57/0434 184/27.2 |

(Continued)

FOREIGN PATENT DOCUMENTS

| | | |
|---|---|---|
| JP | S57-097942 A | 6/1982 |
| JP | 2003-240110 A | 8/2003 |
| JP | 2006-307950 A | 11/2006 |

*Primary Examiner* — Nathaniel E Wiehe
*Assistant Examiner* — Richard C Drake
(74) *Attorney, Agent, or Firm* — Foley & Lardner LLP

(57) ABSTRACT

An oil pump driving control device of a vehicle having a main oil pump (14) that is driven by a motor/generator (4) and produces a pump discharge oil to a first clutch (3), a second clutch (5) and a belt-type continuously variable transmission (6) provided on a driving force transmission line. A hybrid control module (81) is provided in this FF hybrid vehicle. The hybrid control module (81) is configured (Continued)

to perform a control so that during vehicle stop, the lower an ATF oil temperature is, the more the pump driving energy to drive the main oil pump (14) is decreased. With this control, consumption energy during the vehicle stop can be reduced.

9 Claims, 6 Drawing Sheets

(58) Field of Classification Search
USPC .................. 701/51, 60; 477/157; 60/431
See application file for complete search history.

(56) References Cited

U.S. PATENT DOCUMENTS

| | | | | |
|---|---|---|---|---|
| 7,281,370 | B2* | 10/2007 | Furuta | E02F 9/226 60/329 |
| 8,548,701 | B2* | 10/2013 | Tsukamoto | F16H 59/72 701/60 |
| 8,755,979 | B2* | 6/2014 | Ishikawa | F16H 59/72 701/51 |
| 9,039,383 | B2* | 5/2015 | Okamoto | F04B 49/02 417/32 |
| 2003/0171867 | A1* | 9/2003 | Nakamori | B60W 10/30 701/54 |
| 2006/0073924 | A1* | 4/2006 | Izumi | F16H 61/66254 474/28 |
| 2009/0120386 | A1* | 5/2009 | Kamado | F01P 5/043 123/41.11 |
| 2012/0108373 | A1* | 5/2012 | Doihara | F16H 61/66272 474/28 |
| 2014/0294599 | A1* | 10/2014 | Wi | F16H 61/0021 417/2 |
| 2015/0025739 | A1* | 1/2015 | Wakairo | F16H 61/0025 701/36 |
| 2015/0330519 | A1* | 11/2015 | Maurer | F16K 11/04 137/565.26 |
| 2015/0369340 | A1* | 12/2015 | Sugimoto | F16D 13/52 475/159 |
| 2016/0025212 | A1* | 1/2016 | Kawamoto | F16H 61/0031 701/102 |
| 2016/0298755 | A1* | 10/2016 | Kotsuji | F16H 61/0021 |

* cited by examiner

VEHICLE OIL PUMP DRIVING CONTROL DEVICE

The present invention relates to a vehicle oil pump driving control device that controls drive of an oil pump generating a pump discharge oil to a hydraulic pressure working unit (such as a transmission and a clutch) provided on a driving force transmission line during vehicle stop.

BACKGROUND ART

There has been known, for instance, by Patent Document 1, a related art driving control device of a transmission oil pump that when an ATF oil temperature (=a transmission working fluid temperature) is low, in order to immediately increase the ATF oil temperature after a low temperature start, feeds the transmission working fluid to an ATF warmer by driving an electric motor-driven oil pump.

In the related art driving control device, however, the electric motor-driven oil pump is driven when the ATF oil temperature is the low oil temperature at which a viscosity of the transmission working fluid is high. Because of this, when feeding the transmission working fluid to the ATF warmer by driving the electric motor-driven oil pump during the vehicle stop at the low ATF oil temperature, since friction loss is large, a pump drive output becomes high. Therefore, as a problem, consumption energy used as pump driving energy is increased, and consequently, fuel efficiency or electricity efficiency is deteriorated.

CITATION LIST

Patent Document

Patent Document 1: Japanese Unexamined Patent Application Publication No. JP2006-307950

SUMMARY OF THE INVENTION

The present invention was made in view of the above technical problem. An object of the present invention is therefore to provide a vehicle oil pump driving control device that is capable of achieving reduction of the consumption energy during the vehicle stop.

To achieve the above object, an oil pump driving control device of a vehicle having an oil pump that is driven by a vehicle-mounted power source and produces a pump discharge oil to a hydraulic pressure working unit provided on a driving force transmission line, comprises: a controller configured to control a pump drive of the oil pump. And, the controller is configured to perform a control so that during vehicle stop, the lower a working fluid temperature is, the more a pump driving energy to drive the oil pump is decreased.

Therefore, the control so that during vehicle stop, the lower the working fluid temperature is, the more the pump driving energy to drive the oil pump is decreased is performed. That is, when the working fluid temperature is low, a viscosity of the working fluid becomes high, and thus the leak amount from the hydraulic circuit of hydraulic pressure working unit becomes small, thereby reducing an oil pump discharge amount required when outputting a constant pressure. When focusing attention on this point and performing the control so that during the vehicle stop during which a change of the oil pressure does not occur, the lower the working fluid temperature is, the more the pump driving energy to drive the oil pump is decreased, the leak amount from the hydraulic circuit of the hydraulic pressure working unit is compensated with the oil pump discharge amount. In this manner, by performing the oil pump driving control during the vehicle stop with the leak amount from the hydraulic circuit being focused on, the consumption energy used as the pump driving energy is reduced. As a consequence, it is possible to achieve the reduction of the consumption energy during the vehicle stop.

EMBODIMENTS FOR CARRYING OUT THE INVENTION

The best mode to achieve a vehicle oil pump driving control device of the present invention will be explained with reference to FIG. 1.

Embodiment 1

First, a configuration will be explained.

An oil pump driving control device of an embodiment 1 is a control device applied to an FF hybrid vehicle (as an example of vehicles) in which a belt-type continuously variable transmission is mounted as a transmission with right and left front wheels being driving wheels. In the following description, a configuration of the oil pump driving control device for the FF hybrid vehicle of the embodiment 1 will be separately explained by [General system configuration] and [Oil pump driving control process configuration].

Figure 1:
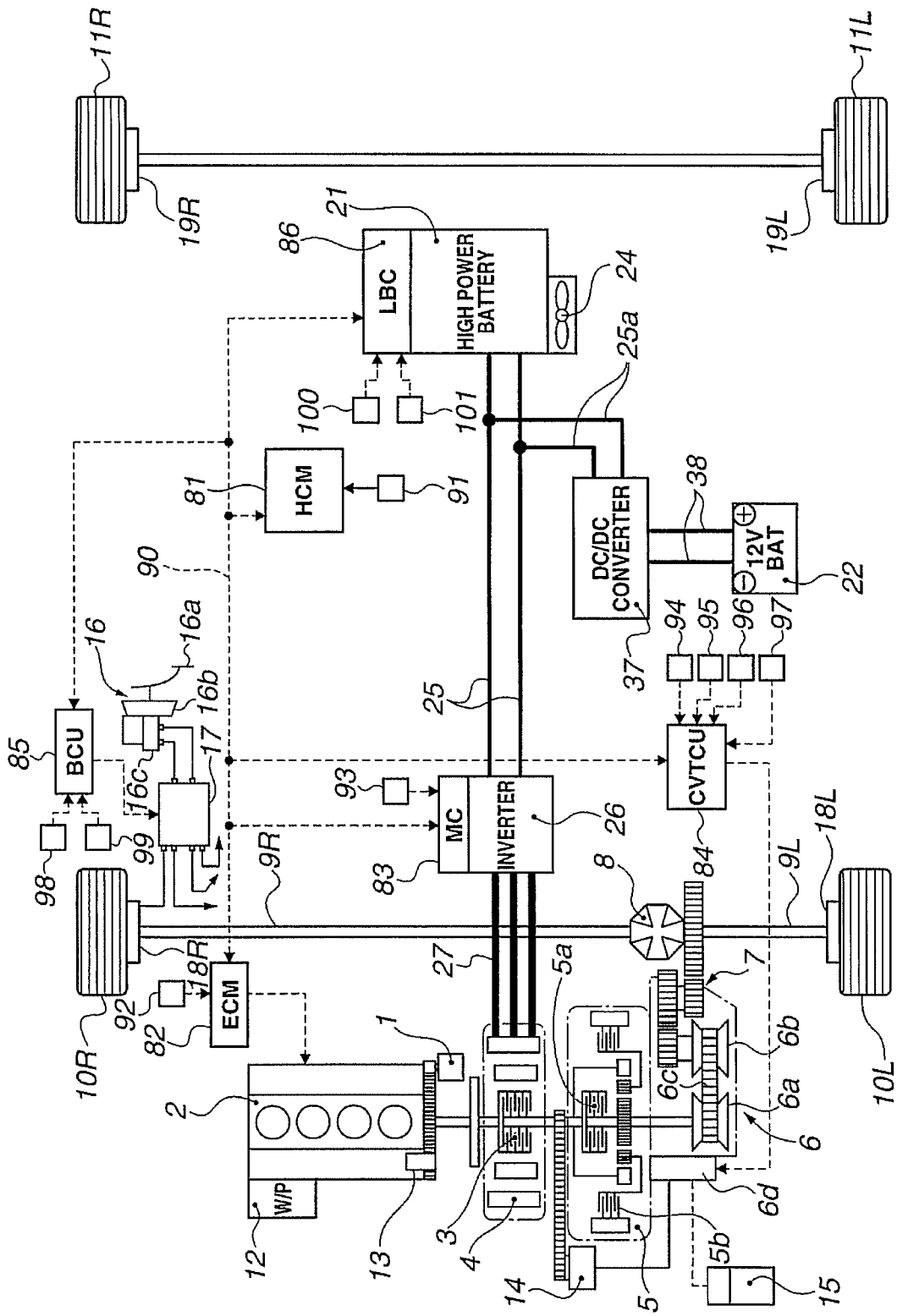
FIG. 1 is a general system diagram showing an FF hybrid vehicle to which a control device of an embodiment 1 is applied.

[General System Configuration]FIG. 1 shows a general system of the FF hybrid vehicle to which the control device of the embodiment 1 is applied. A general system diagram of the FF hybrid vehicle will be explained below with reference to FIG. 1.

As shown in FIG. 1, a driveline of the FF hybrid vehicle has a transverse engine (a transversely mounted engine) 2, a first clutch 3 (called "CL1" for short), a motor/generator 4 (called "MG" for short), a second clutch 5 (called "CL2" for short) and a belt-type continuously variable transmission 6 (called "CVT" for short). An output shaft of the belt-type continuously variable transmission 6 is connected to right and left front wheels 10R, 10L through a final speed reduction gear train 7, a differential gear 8 and right and left drive shafts 9R, 9L. Here, right and left rear wheels 11R, 11L are driven wheels.

The transverse engine 2 is an engine mounted in a front room with a starter motor 1 and a crankshaft direction being a vehicle width direction. The transverse engine 2 is provided with an electric water pump 12 and a crankshaft rotation sensor 13 that detects a reverse rotation of the transverse engine 2. The transverse engine 2 has, as an engine start system, an "MG start mode" in which cranking is carried out by the motor/generator 4 while slip-engaging the first clutch 3 and a "starter start mode" in which the cranking is carried out by the starter motor 1 whose power source is a 12V-battery 22. Here, the "starter start mode" is selected only when a limited condition such as an extremely low temperature condition is satisfied.

The motor/generator 4 is a three-phase AC permanent magnet type synchronous motor connected to the transverse engine 2 through the first clutch 3. A stator coil of this motor/generator 4 is connected to an inverter 26 that converts DC to three-phase AC with an after-mentioned high power battery 21 being a power source in a power running state and converts three-phase AC to DC in a regenerative state through an AC harness 27. Here, the first clutch 3 interposed between the transverse engine 2 and the motor/generator 4 is a hydraulic pressure-operated dry or wet multiple disc clutch. Full engagement, slip-engagement and disengagement of the first clutch 3 are controlled by a first clutch pressure.

The second clutch 5 is a hydraulic pressure-operated wet multiple disc frictional clutch interposed between the motor/generator 4 and the right and left front wheels 10R, 10L of the driving wheels. Full engagement, slip-engagement and disengagement of the second clutch 5 are controlled by a second clutch pressure. The second clutch 5 of the embodiment 1 is a clutch that is also used as a forward travel clutch 5a and a reverse brake 5b provided in a forward-reverse switching mechanism by a planetary gear. That is, at a forward travel of the vehicle, the forward travel clutch 5a is the second clutch 5, whereas at a reverse of the vehicle, the reverse brake 5b is the second clutch 5.

The belt-type continuously variable transmission 6 has a primary pulley 6a and a secondary pulley 6b and a belt 6c wound around theses pulleys 6a and 6b. The belt-type continuously variable transmission 6 continuously varies a transmission ratio by changing a winding diameter of the belt 6c by a primary pressure and a secondary pressure supplied to a primary hydraulic chamber and a secondary hydraulic chamber respectively. The belt-type continuously variable transmission 6 is provided, as a hydraulic pressure source, with a main oil pump 14 (mechanical drive) driven and rotating by a motor shaft of the motor/generator 4 (=a transmission input shaft) and a sub-oil pump 15 (motor drive) used as an auxiliary pump. Further, the belt-type continuously variable transmission 6 is provided with a control valve unit 6d that generates the first clutch pressure, the second clutch pressure and the primary and secondary pressures of the belt-type continuously variable transmission 6 with a line pressure PL generated by regulating a pump discharge pressure from the hydraulic pressure source being an initial pressure. Here, in the embodiment 1, an oil pump that is an object of the oil pump driving control is the main oil pump 14 driven by the motor/generator 4 (as an example of a vehicle-mounted power source) mounted as a travelling drive source.

A hybrid drive system called 1-motor·2-clutch is configured by the first clutch 3, the motor/generator 4 and the second clutch 5. As main driving modes, "EV mode", "HEV mode" and "WSC mode" are provided. The EV mode is an electric vehicle mode in which the first clutch 3 is disengaged, the second clutch 5 is engaged and the drive source is only the motor/generator 4. A travel by the EV mode is called "EV travel". The HEV mode is a hybrid vehicle mode in which the both first and second clutches 3 and 5 are each engaged and the drive source is the transverse engine 2 and the motor/generator 4. A travel by the HEV mode is called "HEV travel". The WSC mode is a CL2 slip-engagement mode in which, in the HEV mode or the EV mode, a motor rotation speed of the motor/generator 4 is controlled and the second clutch 5 is slip-engaged at an engagement torque capacity corresponding to a required driving force. Here, at vehicle stop, by the WSC mode in which the second clutch 5 is slip-engaged, the motor/generator 4 can rotate.

As shown in FIG. 1, a brake system of the FF hybrid vehicle has a brake operation unit 16, a brake fluid pressure control unit 17, right and left front brake units 18R, 18L and right and left rear brake units 19R, 19L. In this brake system, when performing the regenerative braking by the motor/generator 4 upon a brake operation, to achieve a required braking force according to a pedal operation, a regenerative brake cooperative control that covers or compensates a braking force obtained by subtracting a regenerative braking force from the required braking force with a hydraulic braking force is performed.

The brake operation unit 16 has a brake pedal 16a, a negative pressure booster 16b using an intake negative pressure of the transverse engine 2 and a master cylinder 16c etc. This regenerative brake cooperation brake unit 16 is a unit that generates a predetermined master cylinder pressure in accordance with driver's brake pedal depressing force applied to the brake pedal 16a, and this regenerative brake cooperation brake unit 16 is a unit simply configured without using an electric booster.

The brake fluid pressure control unit 17 is configured by an electric oil pump, a pressure-increase solenoid valve, a pressure-decrease solenoid valve and an oil passage switching valve and so on (all not shown). By a control of the brake fluid pressure control unit 17 by a brake control unit 85, a function of generating a wheel cylinder pressure at a brake non-operation and a function of regulating or controlling the wheel cylinder pressure at a brake operation are provided. A control using the pressure generating function at the brake non-operation is a traction control (a TCS control), a vehicle dynamics control (a vehicle dynamic behavior control) (a VDC control), an emergency brake control (an automatic brake control) and so on. A control using the pressure regulating function at the brake operation is the regenerative brake cooperative control, an anti-lock brake control (an ABS control) and so on.

The right and left front brake units 18R, 18L are provided at the right and left front wheels 10R, 10L respectively. The right and left rear brake units 19R, 19L are provided at the right and left rear wheels 11R, 11L respectively. The brake units give a hydraulic braking force to the respective wheels. Each of the brake units 18R, 18L and 19R, 19L has a wheel cylinder (not shown) supplied with a brake fluid pressure (a brake hydraulic pressure) generated by the brake fluid pressure control unit 17.

As shown in FIG. 1, a power supply system of the FF hybrid vehicle has the high power battery 21 as the power source of the motor/generator 4 and the 12V-battery 22 as the power source of 12V-operated loads.

The high power battery 21 is a battery mounted as the power source of the motor/generator 4. For instance, a lithium-ion battery formed by accommodating a cell module formed by a plurality of cells in a battery pack case is used as the high power battery 21. This high power battery 21 has a built-in junction box having a relay circuit to supply, interrupt and split the high power. Further, the high power battery 21 is provided with a cooling fan unit 24 having a battery cooling function and a lithium battery controller 86 monitoring or watching a battery charge capacity (a battery SOC) and a battery temperature.

The high power battery 21 and the motor/generator 4 are connected through a DC harness 25, the inverter 26 and the AC harness 27. The inverter 26 is provided with a motor controller 83 that performs a power running/regenerative control. That is, the inverter 26 converts DC fed from the DC harness 25 to three-phase AC fed to the AC harness 27 in the power running state in which the motor/generator 4 is driven by a discharge of the high power battery 21, and also converts three-phase AC fed from the AC harness 27 to DC fed to the DC harness 25 in the regenerative state in which the high power battery 21 is charged by a power generation by the motor/generator 4.

The 12V-battery 22 is a secondary battery mounted as the power source of the starter motor 1 and the 12V-operated loads that are auxiliary equipment. For instance, a lead-acid battery usually mounted in an engine vehicle is used as the 12V-battery 22. The high power battery 21 and the 12V-battery 22 are connected through a DC branch harness 25a, a DC/DC converter 37 and a battery harness 38. The DC/DC converter 37 converts a few hundred voltage volts applied from the high power battery 21 to 12V. By controlling this DC/DC converter 37 by a hybrid control module 81, a charging amount of the 12V-battery 22 is controlled.

As shown in FIG. 1, an electronic control system of the FF hybrid vehicle has the hybrid control module 81 (called "HCM" for short) as an electronic control unit that executes an integrated control properly controlling a consumption energy of the whole vehicle. As other electronic control units, an engine control module 82 (called "ECM" for short), the motor controller 83 (called "MC" for short) and a CVT control unit 84 (called "CVTCU" for short) are provided. Further, the brake control unit 85 (called "BCU" for short) and the lithium battery controller 86 (called "LBC" for short) are provided. These electronic control units 81, 82, 83, 84, 86 and 86 are connected with each other so as to be able to make interactive information exchange through a CAN communication line (Controller Area Network) 90, and share the information.

The hybrid control module 81 performs various integrated controls on the basis of input information from the other electronic control units 82, 83, 84, 86 and 86 and an ignition switch 91 and so on.

The engine control module 82 performs a start control, a fuel injection control, an ignition control, a fuel cut control and an engine idle rotation control and so on of the transverse engine 2 on the basis of input information from the hybrid control module 81 and an engine rotation speed sensor 92 etc.

The motor controller 83 performs the power running control, the regenerative control, a motor creep control and a motor idle control and so on of the motor/generator 4 by a control command to the inverter 26 on the basis of input information from the hybrid control module 81 and a motor rotation speed sensor 93 etc.

The CVT control unit 84 outputs a control command to the control valve unit 6d on the basis of input information from the hybrid control module 81, an accelerator opening sensor 94, a vehicle speed sensor 95, an inhibitor switch 96 and an ATF oil temperature sensor 97 etc. This CVT control unit 84 performs an engagement pressure control of the first clutch 3, an engagement pressure control of the second clutch 5 and a shift pressure control by the primary pressure and the secondary pressure of the belt-type continuously variable transmission 6 and so on.

The brake control unit 85 outputs a control command to the brake fluid pressure control unit 17 on the basis of input information from the hybrid control module 81, a brake switch 98 and a brake stroke sensor 99 etc. This brake control unit 85 performs the TCS control, the VDC control, the automatic brake control, the regenerative brake cooperative control and the ABS control and so on.

The lithium battery controller 86 controls the battery SOC and the battery temperature and so on of the high power battery 21 on the basis of input information from a battery voltage sensor 100 and a battery temperature sensor 101 etc.

Figure 2:
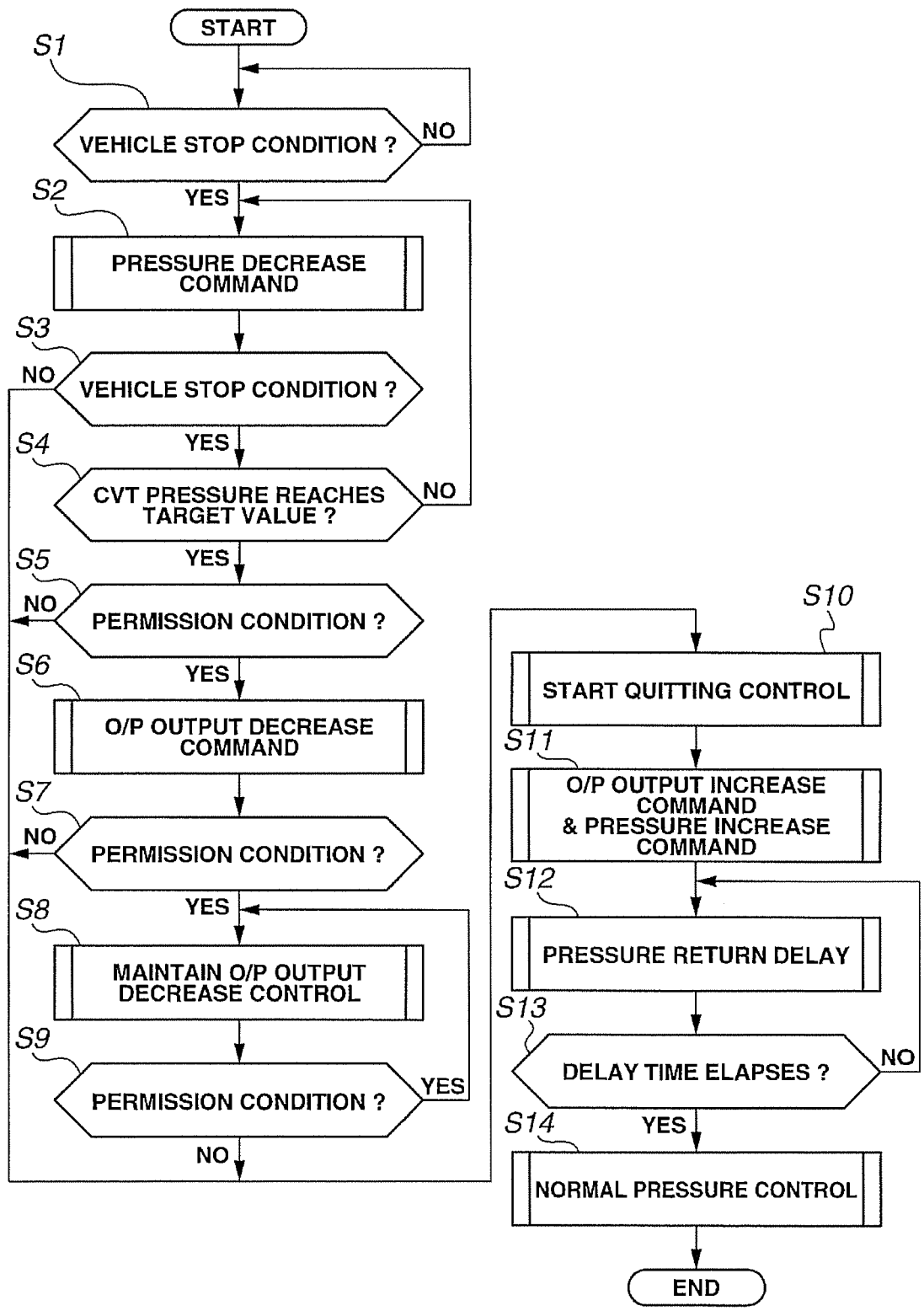
FIG. 2 is a flow chart showing a flow of an oil pump driving control process executed in a hybrid control module of the embodiment 1.

[Oil Pump Driving Control Process Configuration]FIG. 2 is a flow chart showing a flow of an oil pump driving control process executed in the hybrid control module (a controller) 81 of the embodiment 1. The oil pump driving control process executed during an EV vehicle stop will be explained for each step shown in FIG. 2.

At step S1, a judgment is made as to whether or not a vehicle stop condition is satisfied. If YES (the vehicle stop condition is satisfied), the routine proceeds to step S2. If NO (the vehicle stop condition is not satisfied), the judgment of step S1 is repeated. Here, as the vehicle stop condition, the following (a) to (e) are provided.

(a) vehicle speed<a vehicle stop threshold value
(b) selection of D range
(c) selection of EV mode
(d) brake ON
(e) accelerator OFF Here, the "selection of EV mode" includes a case where the EV mode is selected by a mode shift control and a case where the EV mode is selected by engine automatic stop by an idle stop control.

At step S2, after judging that the vehicle stop condition is satisfied at step S1, or after judging that a CVT pressure does not reach a target value at step S4, on the basis of a change from a CVT normal pressure command flag to a CVT pressure decrease permission flag, a CVT pressure decrease command to decrease the CVT pressure (=a secondary pressure Psec) to the target value is outputted to the solenoid valve, and the routine proceeds to step S3.

Here, the "target value" is lower than a required pressure according to an input torque, and is a pressure value of a lower limit pressure level during the EV vehicle stop during which transient changes of an oil pressure and an oil amount do not occur.

At step S3, subsequent to the pressure decrease command at step S2, a judgment is made as to whether or not a vehicle stop condition is satisfied. If YES (the vehicle stop condition is satisfied), the routine proceeds to step S4. If NO (the vehicle stop condition is not satisfied), the routine proceeds to step S10.

Here, as the "vehicle stop condition", the same conditions as those of step S1 are provided.

At step S4, after judging that the vehicle stop condition is satisfied at step S3, a judgment is made as to whether or not the CVT pressure reaches the target value. If YES (the CVT pressure reaches the target value), the routine proceeds to step S5. If NO (the CVT pressure does not reach the target value), the routine is returned to step S2.

At step S5, after judging that the CVT pressure reaches the target value at step S4, a judgment is made as to whether or not a permission condition for permitting the oil pump driving control is satisfied. If YES (the permission condition is satisfied), the routine proceeds to step S6. If NO (the permission condition is not satisfied), the routine proceeds to step S10. Here, as the "permission condition", the following (f) to (h) are added to the conditions (a) to (e) provided as the "vehicle stop condition". Then, when all these conditions (a) to (h) are satisfied, it is judged that the permission condition is satisfied.

(f) a creep cut condition is satisfied.
(g) a CL2 standby learning is completed and a CL2 lower torque learning is completed.
(h) an abnormality judgment of the sensor etc. is not made.

Here, a creep torque indicates a torque by which the vehicle starts to move in a motor idling state without depressing an accelerator pedal, and is a torque required to prevent slipping-down (or slipping-down or rolling-back) of the vehicle at the vehicle stop on an inclined road. With respect to the "creep cut condition", when the vehicle is in the vehicle stop state and a second clutch target torque (TTCL2) obtained by a feed-forward control (FF control) is a predetermined value or less and corresponds to a creep torque on a flat road, it is judged that the creep cut condition" is satisfied.

At step S6, after judging that the permission condition is satisfied at step S5, on the basis of a change from an O/P output decrease forbidden flag to an O/P output decrease permission flag, a motor rotation speed control by an output decrease command to the motor/generator 4, which decreases a rotation speed of the main oil pump 14 to a required O/P rotation speed at a gentle gradient $\alpha$, is performed, and the routine proceeds to step S7.

Figure 3:
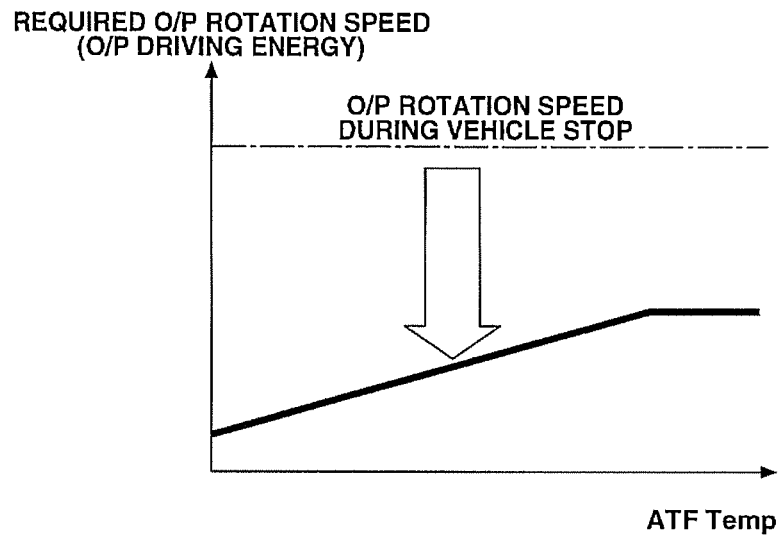
FIG. 3 is characteristics showing a relationship between an ATF oil temperature and a required oil pump rotation speed used for an oil pump output reduction command in the oil pump driving control process of the embodiment 1.

Here, the "required O/P rotation speed" is a target O/P rotation speed in the motor rotation speed control, and is determined by an ATF oil temperature (ATF Temp) from the ATF oil temperature sensor 97. As shown in FIG. 3, the lower the ATF oil temperature is, the lower the required O/P rotation speed is. A characteristic of the required O/P rotation speed with respect to the ATF oil temperature shown in FIG. 3 is set so as to compensate a working fluid leak amount (hereinafter, called a "leak amount") in a hydraulic circuit of the first clutch 3, the second clutch 5 and the belt-type continuously variable transmission 6 (an example of a hydraulic pressure working unit) provided on a driving force transmission line. "O/P" means the oil pump.

At step S7, subsequent to the O/P output decrease command at step S6, a judgment is made as to whether or not a permission condition for permitting the oil pump driving control is satisfied. If YES (the permission condition is satisfied), the routine proceeds to step S8. If NO (the permission condition is not satisfied), the routine proceeds to step S10.

Here, as the "permission condition", the same conditions as those provided at step S5 are provided.

At step S8, after judging that the permission condition is satisfied at step S7, or after judging that a permission condition is satisfied at step S9, an O/P output decrease control that decreases an output (=the O/P rotation speed) of the motor/generator 4 is maintained (or continues), and the routine proceeds to step S9.

Here, regarding the O/P output decrease control, when the rotation speed of the main oil pump 14 is decreased at the gentle gradient $\alpha$ from a rotation speed of a start of the control and the O/P rotation speed reaches the required O/P rotation speed, by holding the O/P rotation speed at the required O/P rotation speed as it stands, the O/P output decrease control is maintained (or continues).

At step S9, subsequent to the continuation of the O/P output decrease control at step S8, a judgment is made as to whether or not a permission condition for permitting the oil pump driving control is satisfied. If YES (the permission condition is satisfied), the routine is returned to step S8. If NO (the permission condition is not satisfied), the routine proceeds to step S10.

Here, as the "permission condition", the same conditions as those provided at step S5 and step S7 are provided.

At step S10, after judging that the vehicle stop condition is not satisfied at step S3, or after judging that the permission condition is not satisfied at step S5 or step S7 or step S9, a quitting control of the oil pump driving control is started, and the routine proceeds to step S11.

At step S11, subsequent to a start of the quitting control at step S10, a pressure increase command of the CVT pressure that has been decreased and an output increase command (a torque increase command) of the motor/generator 4 whose output has been decreased are outputted simultaneously, and the routine proceeds to step S12.

For instance, when judged that the permission condition is not satisfied at step S9, on the basis of a change from the CVT pressure decrease permission flag to the CVT normal pressure command flag, a command to increase the CVT pressure, which has been decreased to the target value, to a CVT normal pressure is outputted to the solenoid valve. At the same time, on the basis of a change from the O/P output decrease permission flag to the O/P output decrease forbidden flag, an output increase command to the motor/generator 4 to increase the rotation speed of the main oil pump 14, which has been decreased to the required O/P rotation speed, to an O/P normal rotation speed at a sharp gradient $\beta(>$the gradient $\alpha$) is outputted. Here, regarding the gradient $\beta$, for instance, it is a fastest rotation increase gradient, which is a potential fastest increase of the O/P, by setting a stepwise target O/P rotation speed in the motor rotation speed control.

At step S12, subsequent to the O/P output increase command and the pressure increase command at step S11, or after judging that a delay time does not elapse at step S13, a pressure return delay time is counted by a timer, and the routine proceeds to step S13.

Here, the pressure return delay time is set according to a pressure response delay time with respect to the command that increases the CVT pressure, which has been decreased to the target value, to the CVT normal pressure.

At step S13, subsequent to the timer count of the pressure return delay time at step S12, a judgment is made as to whether or not the pressure return delay time elapses. If YES (the pressure return delay time elapses), the routine proceeds to step S14. If NO (the pressure return delay time does not elapse), the routine is returned to step S12.

At step S14, after judging that the pressure return delay time elapses at step S13, the control is returned to a normal pressure control, and the routine proceeds to END.

Next, working and effect will be explained. Working and effect of the oil pump driving control device of the FF hybrid vehicle of the embodiment 1 will be separately explained by [Working and effect of oil pump driving control process], [Working and effect of oil pump driving control] and [Feature of oil pump driving control]

[Working and Effect of Oil Pump Driving Control Process]

Working and effect of oil pump driving control process will be explained below with reference to the flow chart of FIG. 2.

When the vehicle stop condition is satisfied, in the flow chart of FIG. 2, the routine proceeds to step S1→step S2→step S3→step S4. As long as it is judged that the CVT pressure does not reach the target value at step S4, the routine of step S2→step S3→step S4 is repeated. At step S2, on the basis of the change from the CVT normal pressure command flag to the CVT pressure decrease permission flag, the CVT pressure decrease command to decrease the CVT pressure (=the secondary pressure Psec) to the target value is outputted to the solenoid valve.

When it is judged that the CVT pressure reaches the target value at step S4 and the permission condition is satisfied, in the flow chart of FIG. 2, the routine proceeds to step S4→step S5→step S6→step S7→step S8→step S9. Then, as long as the permission condition is satisfied at step S9, the routine of step S8→step S9 is repeated. At step S6, on the basis of the change from the O/P output decrease forbidden flag to the O/P output decrease permission flag, the motor rotation speed control by the output decrease command to the motor/generator 4, which decreases the rotation speed of the main oil pump 14 to the required O/P rotation speed at the gentle gradient α, is performed. At step S8, when the rotation speed of the main oil pump 14 is decreased at the gentle gradient α from the rotation speed of the time point when the control is started and the O/P rotation speed reaches the required O/P rotation speed, the O/P decrease control that holds the O/P rotation speed at the required O/P rotation speed as it stands is maintained (or continues).

When it is judged that the permission condition is not satisfied at step S9, in the flow chart of FIG. 2, the routine proceeds to step S9→step S10→step S11→step S12→step S13. Then, as long as the pressure return delay time does not elapse at step S13, the routine of step S12→step S13 is repeated. At step S11, the pressure increase command of the CVT pressure that has been decreased and the output increase command of the motor/generator 4 whose output has been decreased are outputted simultaneously.

When it is judged that the pressure return delay time elapses at step S13, in the flow chart of FIG. 2, the routine proceeds to step S13→step S40→END. At step S14, the control is returned to the normal pressure control.

As described above, when it is judged that the permission condition is not satisfied at step S9, at step S11, on the basis of the change from the CVT pressure decrease permission flag to the CVT normal pressure command flag, the command to increase the CVT pressure, which has been decreased to the target value, to the CVT normal pressure is outputted to the solenoid valve. At the same time, on the basis of the change from the O/P output decrease permission flag to the O/P output decrease forbidden flag, the command to increase the O/P rotation speed, which has been decreased to the required O/P rotation speed, to the O/P normal rotation speed at the sharp gradient β (>the gradient α), by the motor rotation speed control including the output increase command to the motor/generator 4, is outputted.

When it is judged that the vehicle stop condition is not satisfied at step S3, at step S11, on the basis of the change from the CVT pressure decrease permission flag to the CVT normal pressure command flag, a command to increase a CVT pressure of a time of the judgment to the CVT normal pressure is outputted to the solenoid valve.

When it is judged that the permission condition is not satisfied at step S5, at step S11, on the basis of the change from the CVT pressure decrease permission flag to the CVT normal pressure command flag, the command to increase the CVT pressure, which has been decreased to the target value, to the CVT normal pressure is outputted to the solenoid valve.

When it is judged that the permission condition is not satisfied at step S7, at step S11, on the basis of the change from the CVT pressure decrease permission flag to the CVT normal pressure command flag, the command to increase the CVT pressure, which has been decreased to the target value, to the CVT normal pressure is outputted to the solenoid valve. At the same time, on the basis of the change from the O/P output decrease permission flag to the O/P output decrease forbidden flag, the command to increase the O/P rotation speed of a time of the judgment to the O/P normal rotation speed at the sharp gradient β (>the gradient α) is outputted.

[Working and Effect of Oil Pump Driving Control]

The oil pump driving control of the embodiment 1 is a control that optimizes an oil pump discharge amount according to the leak amount of the transmission working fluid (ATF) (FIG. 3). First, a background art and a way to the oil pump driving control of the embodiment 1 will be explained.

A conventional idea of the O/P required driving force during the vehicle stop is to set the O/P required driving force to secure a required line pressure according to an input torque.

Against this conventional idea of the O/P required driving force, inventors of the present invention studied the feasibility of a further reduction of consumption energy. As a consequence, the inventors found that if the vehicle is in the EV vehicle stop in which the transient changes of the oil pressure and the oil amount do not occur, the hydraulic pressure is constant and is stable, and the O/P required driving force at this time is proportional to a leak amount from the hydraulic circuit. However, it is difficult to measure the leak amount from the hydraulic circuit.

However, the leak amount is sensitive to a viscosity (ATF viscosity) of the working fluid. Therefore, the inventors found that by changing the conventional idea of setting the O/P required driving force according to the input torque to an idea of setting the O/P required driving force according to the ATF viscosity, the further reduction of consumption energy can be possible. However, since the ATF viscosity of mass-production vehicle also cannot be directly measured, the inventors studied whether the ATF viscosity can be estimated with respect to an already-measured ATF oil temperature.

As a result, the inventors verified that although a relationship of the ATF viscosity to the ATF oil temperature is a nonlinear relationship, when a value of the ATF viscosity with respect to the ATF oil temperature is estimated as an estimated value with consideration given to variations of the ATF oil temperature-viscosity sensitivity and ATF degradation, accuracy as a vehicle-mountable technique can be ensured. In addition, the inventors verified that from this verification, by further taking variations of the leak amount into consideration, also the leak amount can be estimated with a required accuracy.

Therefore, in order to achieve the further reduction of consumption energy, the inventors proposed a manner of setting the O/P required driving force with the ATF oil temperature being a parameter. A control executed with this being put to practical use is the oil pump driving control of the embodiment 1.

Figure 4:
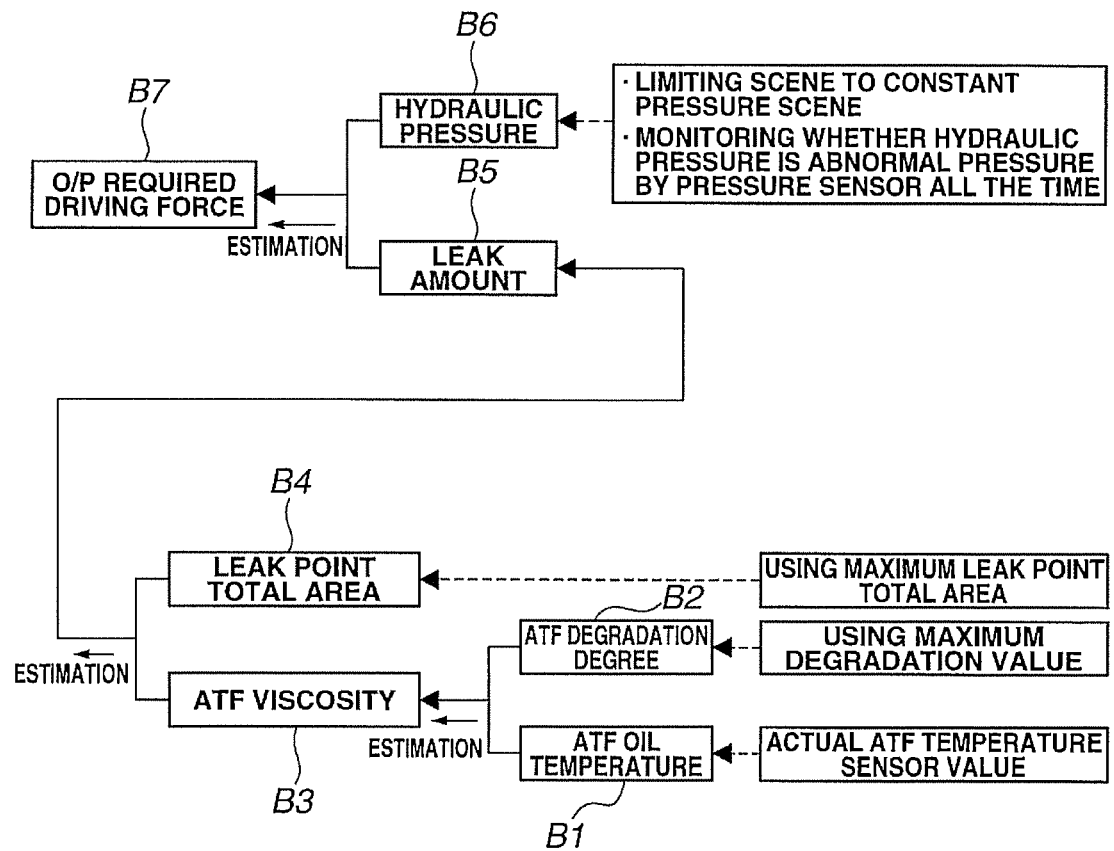
FIG. 4 is a block diagram for explaining that an oil pump required driving force can be estimated by the ATF oil temperature when performing a control that reduces a pump driving energy according to a leak amount in the oil pump driving control of the embodiment 1.

Here, an explanation that when performing a control that decreases a pump driving energy according to the leak amount in the oil pump driving control, the O/P required driving force can be estimated by the ATF oil temperature will be provided with reference to FIG. 4.

The ATF viscosity (B3) is estimated by the ATF oil temperature (B1) obtained by an actual ATF sensor value and an ATF degradation degree (B2) using a maximum degradation value. The leak amount (B5) is estimated by this ATF viscosity (B3) and a leak point total area (B4) using a maximum leak point total area value. The O/P required driving force (B7) is estimated by this leak amount (B5) and a hydraulic pressure (B6) that is a pressure decrease target value provided by limiting a scene to a constant pressure scene and by monitoring all the time whether the hydraulic pressure is an abnormal pressure by a pressure sensor to cope with unexpected leak. In the above manner, the O/P required driving force is estimated by the ATF oil temperature with the required accuracy.

Next, working or operation of control initiation of the oil pump driving control will be explained with reference to a time chart of control initiation of the oil pump driving control shown in FIG. 5.

Figure 5:
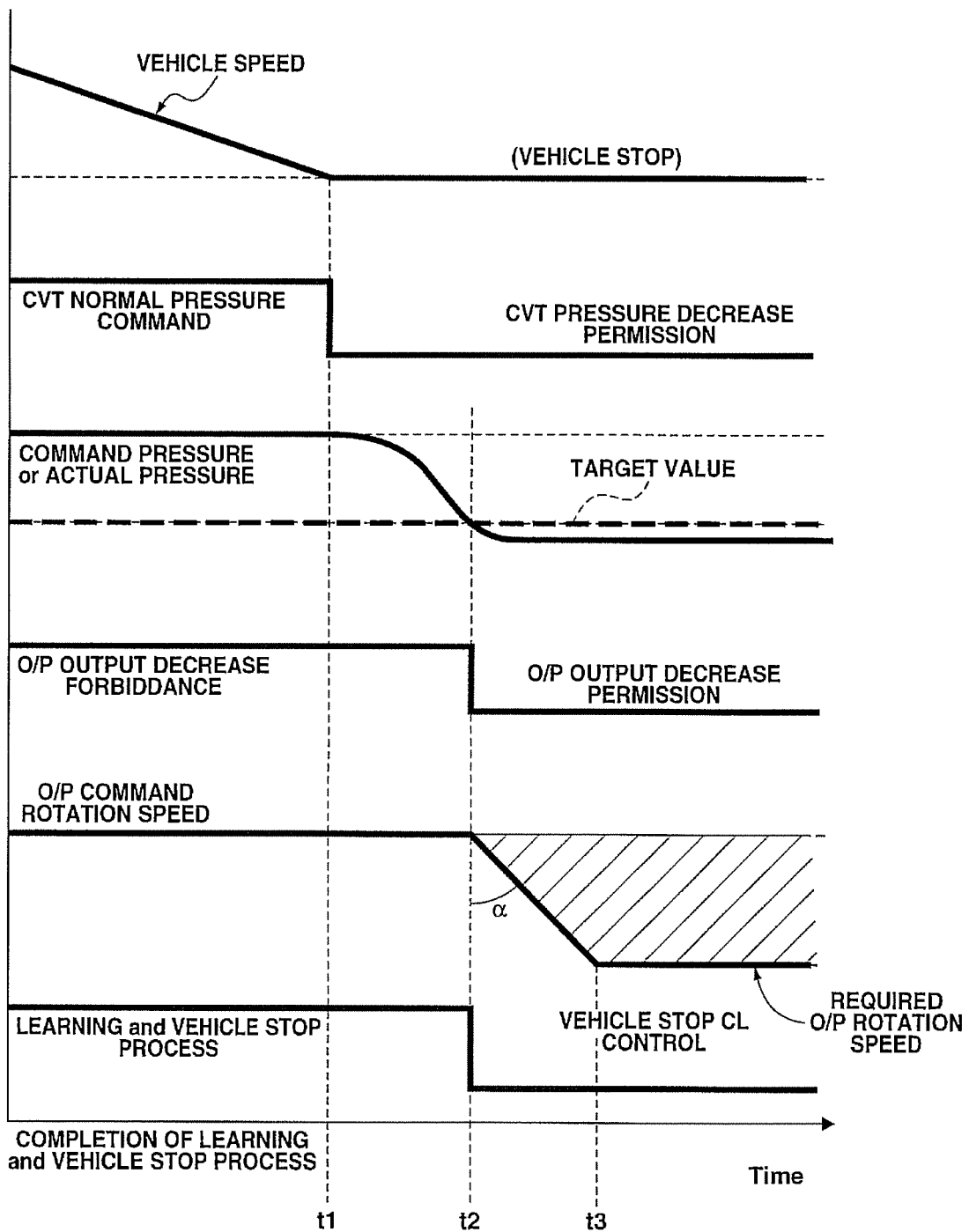
FIG. 5 is time charts of initiation of the control showing a vehicle speed, a CVT hydraulic pressure command flag, a command pressure or an actual hydraulic pressure, an O/P output reduction flag, an O/P command rotation speed and a control mode change in an oil pump driving control start region in the oil pump driving control process of the embodiment 1.

In FIG. 5, time t1 is a time of stop of the vehicle, time t2 is a start time of the oil pump driving control, and time t3 is an end time of the O/P rotation speed decrease.

Since the flag is the CVT normal pressure command flag in a region from a deceleration travel to the vehicle stop at time t1, the CVT pressure (=the secondary pressure Psec) is the CVT normal pressure based on the required line pressure according to the input torque. When the vehicle stops at time t1 and the vehicle stop condition is satisfied, on the basis of the change from the CVT normal pressure command flag to the CVT pressure decrease permission flag, the CVT pressure decrease command to decrease the CVT pressure from the CVT normal pressure to the target value is outputted to the solenoid valve. With this, the CVT pressure is decreased to the target value in a region from time t1 to time t2. When time is time t2 at which the CVT pressure reaches the target value and abnormality-absence judgment occurs and the learning process and a vehicle stop process (a process giving the creep torque) are completed, the permission condition is satisfied. Therefore, at time t2, on the basis of the change from the O/P output decrease forbidden flag to the O/P output decrease permission flag, the torque decrease command to the motor/generator 4, which decreases the rotation speed of the main oil pump 14 to the required O/P rotation speed at the gentle gradient α, is outputted. Then, in a region from time t2 to time t3, the rotation speed of the main oil pump 14 is decreased to the required O/P rotation speed at the gentle gradient α. When time is time t3 at which the rotation speed of the main oil pump 14 reaches the required O/P rotation speed, the rotation speed of the main oil pump 14 is held at the required O/P rotation speed as it stands until the permission condition is not satisfied.

Therefore, in the initiation of the oil pump driving control, a drive energy amount by a decrease amount of the O/P required driving force which corresponds to a decrease amount (an area of hatching of FIG. 5) of the rotation speed of the main oil pump 14 is a reduction amount of the consumption energy during the vehicle stop.

Next, working or operation of quitting of the oil pump driving control will be explained with reference to a time chart of quitting of the oil pump driving control shown in FIG. 6.

Figure 6:
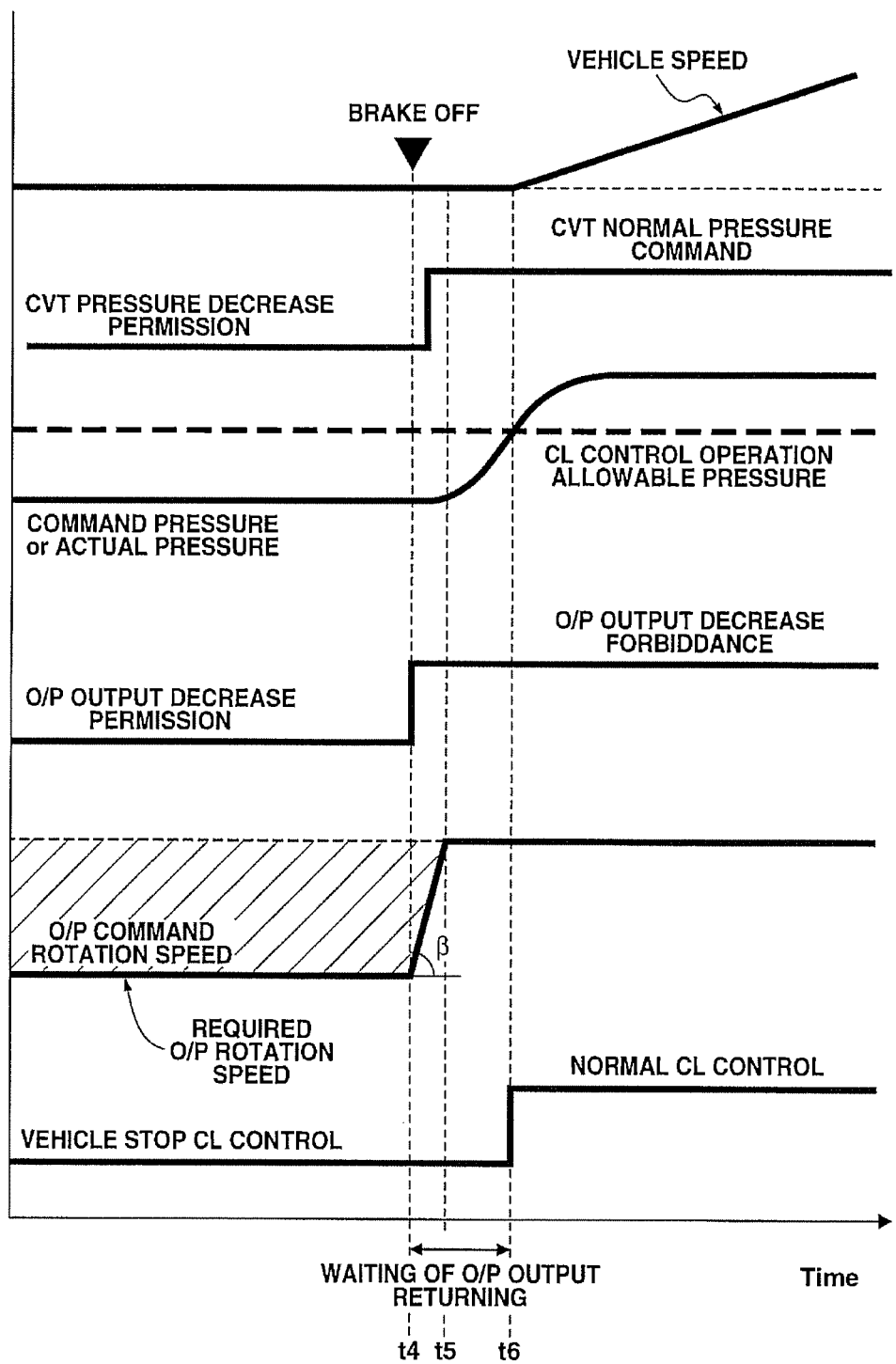
FIG. 6 is time charts of quitting of the control showing a vehicle speed, a CVT hydraulic pressure command flag, a command pressure or an actual hydraulic pressure, an O/P output reduction flag, an O/P command rotation speed and a control mode change in an oil pump driving control start region in the oil pump driving control process of the embodiment 1.

In FIG. 6, time t4 is a time when the permission condition is not satisfied, time t5 is an oil pump rotation speed returning time, and time t6 is a returning start time of the control to the normal pressure control.

In a region up to time t4 at which the permission condition is not satisfied, according to the CVT pressure decrease permission flag, the CVT pressure is held at the lower pressure of the target value, and according to the O/P output decrease permission flag, the rotation speed of the main oil pump 14 is held at the lower rotation speed of the required O/P rotation speed. When the permission condition is not satisfied, for instance, by driver's foot brake pedal release operation at time t4, the pressure increase command of the CVT pressure that has been decreased and the torque increase command of the motor/generator 4 whose torque has been decreased are outputted simultaneously. That is, on the basis of the change from the CVT pressure decrease permission flag to the CVT normal pressure command flag, the CVT pressure starts to increase from the target value to the CVT normal pressure. At the same time, on the basis of the change from the O/P output decrease permission flag to the O/P output decrease forbidden flag, the rotation speed of the main oil pump 14, which has been decreased to the required O/P rotation speed, starts to increase to the O/P normal rotation speed at the sharp gradient β. Then, when time is time t5, the rotation speed of the main oil pump 14 is returned to an original rotation speed (or a previous rotation speed). When time is time t6, the CVT pressure is increased to a clutch control operation allowable pressure. After time t6, since a normal CL control can be carried out, when an accelerator pedal depression operation is performed, the vehicle starts. Here, a time period between time t4 and time t6 is a delay time of waiting of the O/P output returning.

Therefore, in the quitting of the oil pump driving control, a drive energy amount by a decrease amount of the O/P required driving force which corresponds to a decrease amount (an area of hatching of FIG. 6) of the rotation speed of the main oil pump 14 is a reduction amount of the consumption energy during the vehicle stop. In the initiation of the control, first, the CVT pressure decrease control is started, and after that, the O/P output decrease control is started. In contrast, in the quitting of the control, the CVT pressure increase control and the O/P output increase control are started at the same time. Further, the increase gradient β in the O/P output increase control is set to be greater than the decrease gradient α in the O/P output decrease control.

[Feature of Oil Pump Driving Control]

In the embodiment 1, the hybrid control module 81 is configured to perform the control so that during the vehicle stop, the lower the ATF oil temperature is, the more the pump driving energy to drive the main oil pump 14 is decreased.

That is, when the ATF oil temperature is low, the ATF viscosity becomes high, and thus the leak amount from the hydraulic circuit of the first clutch 3, the second clutch 5 and the belt-type continuously variable transmission 6 becomes small, thereby reducing the oil pump discharge amount required when outputting the constant pressure. When focusing attention on this point and performing the control so that during the vehicle stop during which the transient change of the oil pressure does not occur, the lower the ATF oil temperature is, the more the pump driving energy is decreased, the leak amount from the hydraulic circuit of the first clutch 3, the second clutch 5 and the belt-type continuously variable transmission 6 is compensated with the oil pump discharge amount.

Therefore, by performing the oil pump driving control during the vehicle stop with the leak amount from the hydraulic circuit being focused on, the consumption energy used as the pump driving energy is reduced.

In the embodiment 1, as the control decreasing the pump driving energy, it is configured to perform the control decreasing the drive output of the motor/generator 4 that drives the main oil pump 14.

That is, by performing the control decreasing the drive output (=motor torque) of the motor/generator 4, a discharge amount from the high power battery 21 to the motor/generator 4 can be suppressed to a small amount, and reduction of a battery capacity of the high power battery 21 can be prevented.

Therefore, by the decrease control of the drive output of the motor/generator 4, the consumption energy used by the motor/generator 4 during the vehicle stop is reduced.

In the embodiment 1, the required O/P rotation speed for compensating the working fluid leak amount in the hydraulic circuit of the first clutch 3, the second clutch 5 and the belt-type continuously variable transmission 6 is determined according to the ATF oil temperature (FIG. 3). Then, as the control decreasing the drive output of the motor/generator 4, the motor rotation speed control is performed with the setting required O/P rotation speed being the target O/P rotation speed.

That is, since a discharge oil amount per unit rotation is fixed by specifications of the pump, the oil pump rotation speed is proportional to the oil pump discharge oil amount. Therefore, in the case where the leak amount in the hydraulic circuit is compensated with the oil pump discharge oil amount, when the control is performed using the oil pump rotation speed, the control is accurately performed. Then, when performing the motor rotation speed control, the control decreasing the motor torque is carried out so as to decrease an actual O/P rotation speed to an identical direction to the target O/P rotation speed.

Therefore, by the drive output decrease control of the motor/generator 4 which is accurately controlled with respect to the leak amount in the hydraulic circuit, minimization (optimization) of the consumption energy during the vehicle stop can be achieved.

In the embodiment 1, as the permission condition of the pump driving energy decrease control, the creep cut condition, the non-learning control condition and the abnormality-absence judgment condition are added to the vehicle stop condition.

That is, by adding the creep cut condition and the non-learning control condition, the pump driving energy decrease control is permitted with a vehicle stop scene in which a change of an external driving force is small being an object. Further, by adding the abnormality-absence judgment condition, it is possible to cope with the unexpected working fluid leak.

Therefore, as the permission condition, by adding the conditions provided with the vehicle stop scene in which the changes of the oil pressure and the oil amount are suppressed being the object, safety of the pump driving energy decrease control is ensured.

In the embodiment 1, when starting the pump driving energy decrease control according to the judgment that the permission condition is satisfied, the control decreasing the pressures of the first clutch 3, the second clutch 5 and the belt-type continuously variable transmission 6 to the respective target values of the lower limit pressure levels is performed prior to the start of the pump driving energy decrease control.

For instance, if the pump driving energy decrease control and the pressure decrease control are started at the same time, the pump discharge amount from the main oil pump 14 is rapidly decreased, and there is a risk that undershoot will arise in an actual secondary pressure due to an oil amount decrease. And, if the undershoot arises, hunting showing repeat of increase and decrease of the actual secondary pressure occurs, and this causes oil vibration.

In contrast to this, upon the initiation of the pump driving energy decrease control, by executing the pressure decrease control prior to the start of the pump driving energy decrease control, it is possible to avoid the undershoot and the oil vibration.

In the embodiment 1, the judgment as to whether the permission condition is satisfied is made during the continuation of the pump driving energy decrease control, and when the permission condition is not satisfied, the pump driving energy decrease control is stopped.

For instance, there is a case where a mode change from the EV mode to the HEV mode through an engine start control occurs in response to a system requirement due to decrease of the battery capacity. If the pump driving energy decrease control is maintained (or continues) as it stands when this mode change request arises during the continuation of the pump driving energy decrease control, this brings about lack of the oil amount, overshoot and undershoot of the hydraulic pressure, the oil vibration and deterioration of durability of the hydraulic pressure working unit etc.

For this matter, by immediately stop the pump driving energy decrease control when the permission condition is not satisfied during the continuation of the pump driving energy decrease control, various influences caused by the continuation of the control can be removed.

In the embodiment 1, when judged that the permission condition is not satisfied, the increase command of the pump driving energy and the pressure increase command to the hydraulic pressure working unit are outputted simultaneously, and when the delay time elapses, the control is shifted to the normal pressure control.

For instance, if first the increase command of the pump driving energy is outputted then after that the pressure increase command to the hydraulic pressure working unit is outputted, the oil amount becomes redundant as an oil amount balance. Meanwhile, if first the pressure increase command to the hydraulic pressure working unit is outputted and after that the increase command of the pump driving energy is outputted, shortage of the oil amount occurs as the oil amount balance. Further, if the control is shifted to the normal pressure control without taking the pressure response delay into consideration, excess and deficiency of the oil amount balance occur. These cases bring about lack of the oil amount, overshoot and undershoot of the hydraulic pressure, the oil vibration and deterioration of durability of the hydraulic pressure working unit etc.

For these matters, by performing the two increase controls simultaneously upon the quitting of the pump driving energy decrease control and shifting the control to the normal pressure control when the delay time elapses, various influences can be removed.

In the embodiment 1, when outputting the increase command of the pump driving energy, the pump driving energy is returned at the increase gradient β that is sharper or steeper than the decrease gradient α of the pump driving energy.

For instance, when the permission condition is not satisfied by the driver's foot brake pedal release operation with the intention of starting the vehicle, for a subsequent vehicle start, there is a need to start the normal pressure control by generating the hydraulic pressure with a good response.

For this matter, by generating the hydraulic pressure with the good response when the permission condition is not satisfied with the driver' s intention to start the vehicle, a driving force transmission arrangement is early made, thereby meeting the driver's vehicle start request.

Next, effects will be explained.

The oil pump driving control device for the FF hybrid vehicle of the embodiment 1 can obtain the following effects.

(1) An oil pump driving control device of a vehicle (an FF hybrid vehicle) having an oil pump (a main oil pump 14) that is driven by a vehicle-mounted power source (a motor/generator 4) and produces a pump discharge oil to a hydraulic pressure working unit (a first clutch 3, a second clutch 5 and a belt-type continuously variable transmission 6) provided on a driving force transmission line, has: a controller (a hybrid control module 81) configured to control a pump drive of the oil pump (the main oil pump 14), and the controller (the hybrid control module 81) is configured to perform a control so that during vehicle stop, the lower the working fluid temperature (the ATF oil temperature) is, the more the pump driving energy to drive the oil pump (the main oil pump 14) is decreased.

It is therefore possible to achieve the reduction of the consumption energy during the vehicle stop.

(2) The controller (the hybrid control module 81) is configured to perform, as the control decreasing the pump driving energy, a control that decreases a drive output of the vehicle-mounted power source (the motor/generator 4) driving the oil pump (the main oil pump 14).

Therefore, in addition to effects of (1), by the decrease control of the drive output of the vehicle-mounted power source (the motor/generator 4), the consumption energy used by the vehicle-mounted power source (the motor/generator 4) during the vehicle stop can be reduced.

(3) The controller (the hybrid control module 81) is configured to set, according to the working fluid temperature (the ATF oil temperature), a required oil pump rotation speed (a required O/P rotation speed) for compensating a leak amount of a working fluid in a hydraulic circuit of the hydraulic pressure working unit (the first clutch 3, the second clutch 5 and the belt-type continuously variable transmission 6), and configured to perform, as the control decreasing the drive output of the vehicle-mounted power source (the motor/generator 4), a rotation speed control with a setting required oil pump rotation speed (a required O/P rotation speed) being a target oil pump rotation speed (a target O/P rotation speed).

Therefore, in addition to effects of (2), by the drive output decrease control of the vehicle-mounted power source (the motor/generator 4) which is accurately controlled with respect to the leak amount in the hydraulic circuit, minimization (optimization) of the consumption energy during the vehicle stop can be achieved.

(4) The controller (the hybrid control module 81) is configured to add, as a permission condition of the pump driving energy decrease control, a creep cut condition, a non-learning control condition and an abnormality-absence judgment condition to a vehicle stop condition.

Therefore, in addition to effects of (1) to (3), as the permission condition, by adding the conditions provided with the vehicle stop scene in which the changes of the oil pressure and the oil amount are suppressed being the object, safety of the pump driving energy decrease control is ensured.

(5) The controller (the hybrid control module 81) is configured to, when starting the pump driving energy decrease control according to a judgment that the permission condition is satisfied, perform a control that decreases a pressure of the hydraulic pressure working unit (the first clutch 3, the second clutch 5 and the belt-type continuously variable transmission 6) prior to the start of the pump driving energy decrease control.

Therefore, in addition to effects of (4), upon the initiation of the pump driving energy decrease control, by executing the pressure decrease control prior to the start of the pump driving energy decrease control, it is possible to avoid the undershoot and the oil vibration.

(6) The controller (the hybrid control module 81) is configured to judge, during continuation of the pump driving energy decrease control, whether the permission condition is satisfied, and configured to stop the pump driving energy decrease control when the permission condition is not satisfied.

Therefore, in addition to effects of (5), by immediately stop the pump driving energy decrease control when the permission condition is not satisfied during the continuation of the pump driving energy decrease control, various influences caused by the continuation of the control can be removed.

(7) The controller (the hybrid control module B1) is configured to simultaneously output an increase command of the pump driving energy and a pressure increase command of the hydraulic pressure working unit (the first clutch 3, the second clutch 5 and the belt-type continuously variable transmission 6) when judged that the permission condition is not satisfied, and configured to shift the control to a normal pressure control when a pressure return delay time elapses.

Therefore, in addition to effects of (5) or (6), by performing the two increase controls simultaneously upon the quitting of the pump driving energy decrease control and shifting the control to the normal pressure control when the pressure return delay time (the delay time) elapses, various influences can be removed.

(8) The controller (the hybrid control module 81) is configured to return the pump driving energy at an increase gradient β that is steeper than a decrease gradient α of the pump driving energy when outputting the increase command of the pump driving energy.

Therefore, in addition to effects of (7), by generating the hydraulic pressure with the good response when the permission condition is not satisfied with the driver's intention to start the vehicle, a driving force transmission arrangement is early made, thereby meeting the driver's vehicle start request.

Although the vehicle oil pump driving control device of the present invention has been explained on the basis of the embodiment 1, a specified configuration is not limited to the embodiment 1. The configuration includes all design modifications and equivalents belonging to the technical scope of the present invention.

The embodiment 1 shows an example in which, as the transmission, the belt-type continuously variable transmission 6 having the primary pulley 6a, the secondary pulley 6b and the belt 6c wound around theses pulleys 6a and 6b and performing the shift (speed change) with a primary pulley pressure Ppri and the secondary pulley pressure Psec being shift pressures is used. However, as the transmission, an automatic transmission called a step AT, an AMT whose shift is automatized with a manual transmission mechanism, a DCT which has two clutches and whose shift is automatized with a manual transmission mechanism and so on could be used.

The embodiment 1 shows an example in which, as the clutch, the first clutch 3 and the second clutch 5 are used. However, as the clutch, a start clutch, a lock-up clutch provided at a torque converter could be used.

The embodiment 1 shows an example in which, as the vehicle-mounted power source to drive the main oil pump 14, the motor/generator 4 provided as the travelling drive source is used. However, as the vehicle-mounted power source to drive the main oil pump 14, an electric motor dedicated to the oil pump (an electric oil pump) and the engine which is provided as the travelling drive source and a decrease control of rotation speed of which in an idle rotation speed region can be possible could be used.

Figure 7:
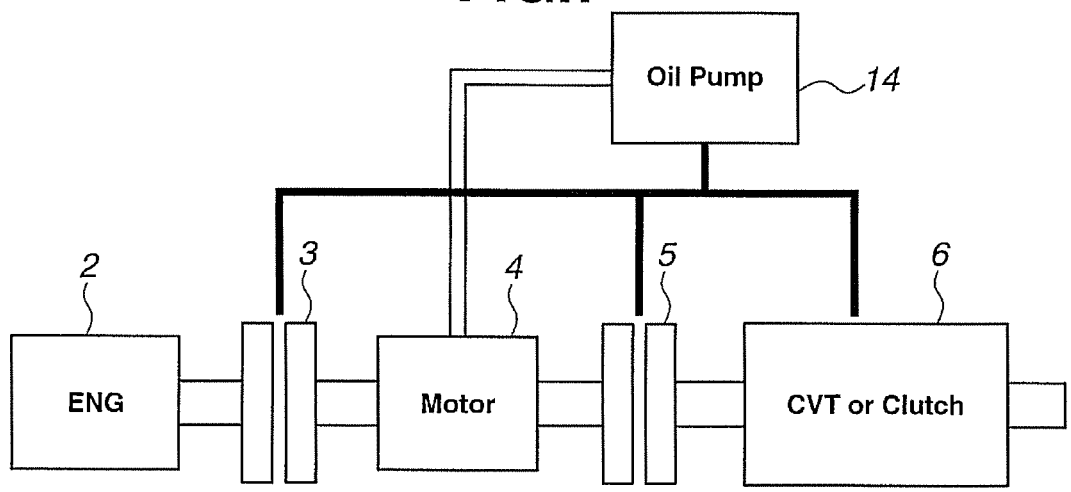
FIG. 7 is a schematic diagram showing a case where an object of the oil pump driving control is a motor/generator provided as a driving source of a hybrid vehicle like the embodiment 1.
Figure 8:
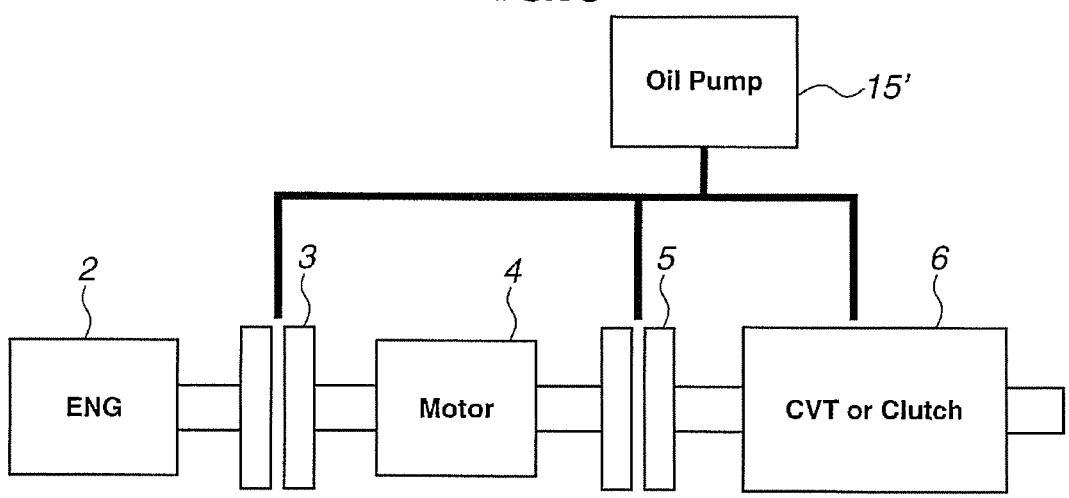
FIG. 8 is a schematic diagram showing a case where an object of the oil pump driving control is an electric motor that independently drives the pump in the hybrid vehicle.
Figure 9:
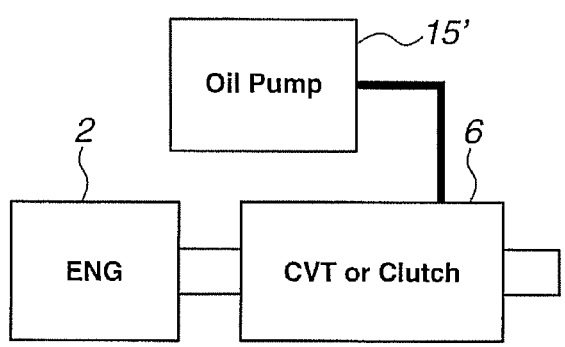
FIG. 9 is a schematic diagram showing a case where an object of the oil pump driving control is an electric motor that independently drives the pump in an engine vehicle to which an idle stop control is applied.

That is, as shown in FIG. 7, the embodiment 1 shows that the main oil pump 14 driven by the motor/generator 4 is provided, and the first clutch 3, the second clutch 5 and the belt-type continuously variable transmission 6 are the hydraulic pressure working unit. However, as shown in FIG. 8, an electric oil pump driven by an electric motor dedicated to the oil pump could be provided, and the first clutch, the second clutch and the belt-type continuously variable transmission are the hydraulic pressure working unit. Further, as shown in FIG. 9, an electric oil pump could be provided in an engine vehicle having an idle stop control function and a coast stop control function, and a transmission and a clutch are the hydraulic pressure working unit.

The embodiment 1 shows an example in which, as the pump drive output of the motor/generator 4 of the vehicle-mounted power source, the motor torque is used. However, as the pump drive output, in a case where the vehicle-mounted power source is the electric motor, besides the motor torque, a motor current or a motor voltage used for calculation of the pump driving energy could be used. In a case where the vehicle-mounted power source is the engine, a fuel injection amount etc. could be used.

The embodiment 1 shows an example in which the oil pump driving control device of the present invention is applied to the FF hybrid vehicle by a drive system of the 1-motor·2-clutch. However, the oil pump driving control device of the present invention can be applied to an FR hybrid vehicle and a hybrid vehicle having a power split mechanism other than the 1-motor·2-clutch. Further, as long as a vehicle has an oil pump that is driven by the vehicle-mounted power source and produces a pump discharge oil to the hydraulic pressure working unit provided on the driving force transmission line, even if this vehicle is an engine vehicle or an electric vehicle or a fuel cell powered vehicle, the oil pump driving control device of the present invention can be applied to these vehicles.

The invention claimed is:

1. An oil pump driving control device of a vehicle having an oil pump that is driven by a vehicle-mounted power source and is structured to provide a pump discharge oil to a hydraulic pressure working unit provided on a driving force transmission line, the oil pump driving control device comprising:
a controller configured to control a pump drive of the oil pump,
the controller being configured to perform a control such that during a vehicle stop, after decreasing a pressure of the hydraulic pressure working unit, the lower a working fluid temperature is, the more a pump driving energy to drive the oil pump is decreased.

2. The oil pump driving control device of the vehicle as claimed in claim 1, wherein:
the controller is configured to perform, as the control decreasing the pump driving energy, a control that decreases a drive output of the vehicle-mounted power source driving the oil pump.

3. The oil pump driving control device of the vehicle as claimed in claim 2, wherein:
the controller is configured to set, according to the working fluid temperature, a required oil pump rotation speed for compensating a leak amount of a working fluid in a hydraulic circuit of the hydraulic pressure working unit, and is configured to perform, as the control decreasing the drive output of the vehicle-mounted power source, a rotation speed control with a setting required oil pump rotation speed being a target oil pump rotation speed.

4. The oil pump driving control device of the vehicle as claimed in claim 1, wherein:
the controller is configured to add, as a permission condition of the pump driving energy decrease control, a creep cut condition, a non-learning control condition and an abnormality-absence judgment condition to a vehicle stop condition.

5. The oil pump driving control device of the vehicle as claimed in claim 4, wherein:
the controller is configured to judge, during continuation of the pump driving energy decrease control, whether the permission condition is satisfied, and is configured to stop the pump driving energy decrease control when the permission condition is not satisfied.

6. The oil pump driving control device of the vehicle as claimed in claim 4, wherein:
the controller is configured to simultaneously output an increase command of the pump driving energy and a pressure increase command of the hydraulic pressure working unit when a judgment is made that the permission condition is not satisfied, and is configured to shift the control to a normal pressure control when a pressure return delay time elapses.

7. The oil pump driving control device of the vehicle as claimed in claim 6, wherein:
the controller is configured to return the pump driving energy at an increase gradient that is steeper than a decrease gradient of the pump driving energy when outputting the increase command of the pump driving energy.

8. The oil pump driving control device of the vehicle as claimed in claim 1, wherein the hydraulic pressure working unit comprises at least a belt-type continuously variable transmission.

9. The oil pump driving control device of the vehicle as claimed in claim 8, wherein the hydraulic pressure working unit comprises at least one clutch and the belt-type continuously variable transmission.

* * * * *